United States Patent [19]

Fay

[11] Patent Number: 5,669,113
[45] Date of Patent: Sep. 23, 1997

[54] HOSE CLAMP

[75] Inventor: Robert F. Fay, York, Pa.

[73] Assignee: Murray Corporation, Hunt Valley, Md.

[21] Appl. No.: 691,021

[22] Filed: Aug. 5, 1996

[51] Int. Cl.⁶ .................................................. B65D 63/00
[52] U.S. Cl. ...................... 24/20 CW; 24/20 R; 24/20 EE
[58] Field of Search ........................ 24/20 CW, 20 R, 24/19, 22, 20 EE, 20 W, 23 W, 23 EE

[56] References Cited

U.S. PATENT DOCUMENTS

| Re. 33,639 | 7/1991 | Oetiker. | |
|---|---|---|---|
| 4,299,012 | 11/1981 | Oetiker. | |
| 4,492,004 | 1/1985 | Oetiker | 24/23 W |
| 4,622,720 | 11/1986 | Oetiker. | |
| 4,711,001 | 12/1987 | Oetiker. | |
| 4,991,266 | 2/1991 | Oetiker. | |
| 5,103,535 | 4/1992 | Ishijima | 24/20 EE |
| 5,105,509 | 4/1992 | Lilley | 24/20 R |
| 5,138,746 | 8/1992 | Ojima et al. | 24/20 CW |
| 5,191,684 | 3/1993 | Kenwright | 24/20 CW |
| 5,305,499 | 4/1994 | Oetiker. | |
| 5,339,496 | 8/1994 | Oetiker | 24/19 |

*Primary Examiner*—Victor N. Sakran
*Attorney, Agent, or Firm*—Nixon & Vanderhye

[57] ABSTRACT

The clamp includes an overlapping end portion having a plurality of apertures spaced longitudinally from one another with each aperture having an inward projection. An ear projects outwardly between the apertures and an elongated slot in the overlapping portion. The lapped portion includes a plurality of openings, each having an outwardly projecting hook. The hooks and projections are geometrically shaped to, upon engagement with one another, laterally center the lapped and lapping portions and interlock the portions to one another. The lapped portion includes an outwardly projecting protuberance engageable in the slot of the lapping portion to guide the portions for longitudinal and laterally constrained movement. The ear has parallel sides and lobes projecting outwardly from the sides, forming a purchase for the jaws of a crimping tool, preventing the tool from slipping from the ear. Upon interlocking the hooks and projections, the ear is crimped to secure the clamp about the parts.

16 Claims, 4 Drawing Sheets

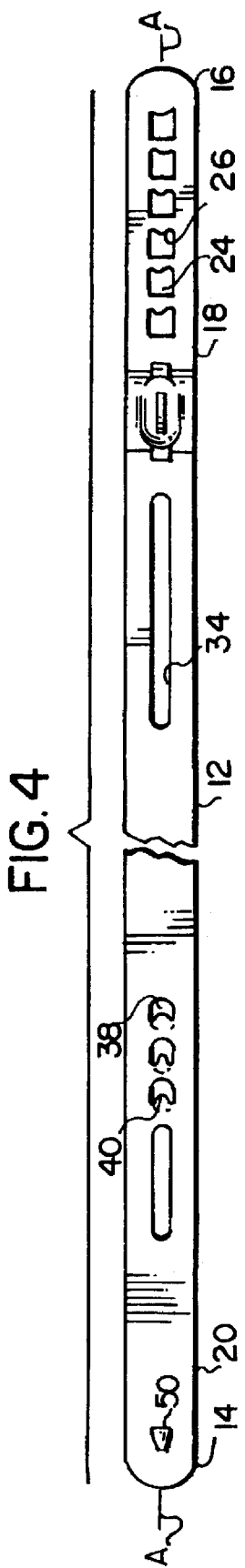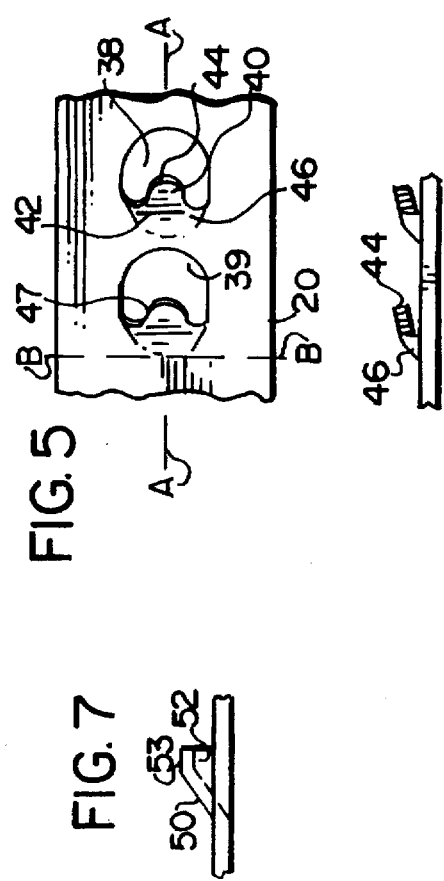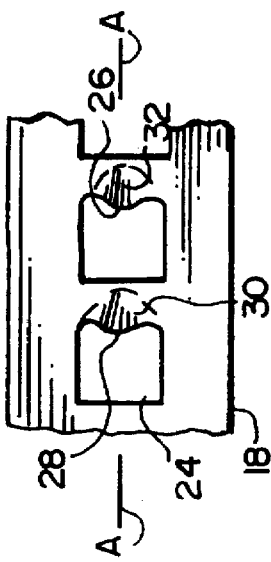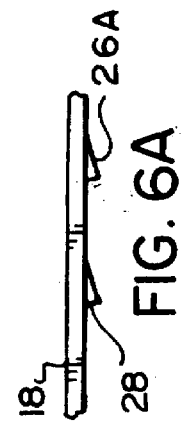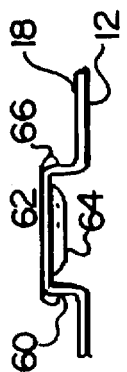

HOSE CLAMP

TECHNICAL FIELD

The present invention relates to hose clamps and particularly hose clamps of the type having a band with overlapped and underlapped end portions for securing the band about a joint and an ear on the overlapping band end portion which can be crimped to secure the band about the joint.

BACKGROUND

A wide variety of hose clamps have been designed, proposed and constructed in the past, with many such clamps being currently commercially available. Typically, a hose clamp consists of a metal band having overlapping and underlapping end portions, with the overlapping portion having openings and the underlapping portion having tabs engaging in the openings of the overlapping portion to secure the clamp about the joint. The conventional hose clamp also has an ear which projects outwardly from the overlapping portion and which ear can be crimped by a crimping tool to tighten and secure the clamp about the joint. Certain problems, however, exist with respect to these conventional hose clamps.

For example, certain of the known hose clamps have tabs on the underlapping end portions which, when received in the openings of the overlapping end portion, tend to deform during installation. Typically, an installation tool is passed through openings in the overlapping and underlapping end portions to leverage the overlapping portion over the underlapped portion and enable the tabs to be received in the openings. When the tool is inserted, it frequently engages the tabs and bends the tabs, causing damage which precludes secure clamp engagement. That is, the diameter of the installed clamp prior to crimping becomes a variable from clamp to clamp and affords uncertainties in achieving a solid lock-up of the clamp and hence an effective seal about the joint. Moreover, the geometry of the tabs and the openings have in the past been such that to leverage the overlapping portion relative to the underlapping portion, the tool is necessarily inserted through an opening of the overlapping portion at an approximate overcenter or center position. This effectively decreases the leverage and requires additional manual force to insert the tabs into the openings. That is, the clamp geometry only permits a generally radial insertion of the tool and does not permit insertion at a substantial angle relative to the radial position which would beneficially afford substantial clamp closing leverage with minimum applied force upon movement of the tool toward the radial position. Prior clamps also do not typically have an effective means to prevent lateral misalignment of the overlapping and underlapping end portions during installation or when properly secured. That is, the overlapping and underlapping portions may become off-center relative to one another, i.e., laterally displaced, hence skewing the clamp on the joint. Where tracking of the overlapping and underlapping portions has been provided, lateral displacement may still occur. In one prior clamp, a tracking tab extends below the underlapping portion and into the clamped part potentially causing damage to the joint or joint parts.

Still a further problem associated with prior hose clamps is the difficulty in their manufacture, particularly with respect to the tapered side walls of the ears. The side walls of the ears are tapered to provide a purchase for the crimping tool when the clamp is crimped into final securement. The formation of tapered side walls requires a more difficult manufacturing step than the formation of generally parallel side walls on the ear. However, providing parallel side walls on the ear does not provide an effective purchase for the crimping tool and the crimping tool may slip from the clamp during use. These and other problems and difficulties associated with prior clamps are minimized or overcome by the hose clamp of the present invention.

DISCLOSURE OF THE INVENTION

In accordance with the present invention, there is provided a hose clamp comprised of an elongated, preferably metal band, having opposite ends and overlapping and underlapping end portions specifically configured to provide (i) a known clamping diameter upon installation; (ii) a self-centering action when the overlapping and underlapping end portions engage one another; and (iii) an ear having parallel side walls, yet affording a purchase for the crimping tool. To accomplish the foregoing and other objectives, the present invention provides an elongated, preferably metal band, wherein the overlapping end portion is provided with a plurality of apertures, generally rectilinear in shape, with projections extending generally radially inwardly a distance equal to or less than the thickness of the band. The projections extend away from the end of the overlapping portion and are recessed and tapered for cooperation with hooks on the underlapping end portion. The underlapping end portion has a plurality of radially outwardly projecting hooks on the side of apertures which extend away from the end of the underlapping portion. The hooks are tapered and have a geometry for cooperation with the projections of the overlapping portion to provide a self-centering action when the overlapping portion is applied to the underlapping portion. Particularly, the geometry of the openings and apertures is such that a tool can be inserted through an aperture and an opening at a sufficient angle away from a centered or radially extending position to afford substantial leverage upon moving the tool toward the center (radial) and overcenter positions to insert the hooks into the apertures of the overlapping portion. The hooks and projections are tapered and, upon removal of the tool, cooperate to center the overlapping and underlapping portions as they engage one another. The hooks are also formed in the manufacturing process such that the applied loadings, including the installation tool, cannot deform the hooks whereby a consistent diameter upon installation of the clamp is provided from clamp to clamp.

Additionally, the present invention provides a slot in the overlapping end portion which cooperates with a protuberance on the underlapping end portion to provide a self-centering action. The protuberance projects radially outwardly and has tapered side walls whereby, upon insertion of the protuberance into the slot, the underlapping portion is self-centered relative to the overlapping portion.

Another aspect of the present invention provides an ear which has generally parallel extending side walls and lobes which project from the bridging portion of the band between the side walls of the ear. The lobes project longitudinally away from one another and define with the side walls and band a purchase on opposite sides of the ear for the crimping tool. Consequently, when the tool grips about the ear, the tool cannot slip off or cant away from the ear because of the projection of the lobes.

In a preferred embodiment according to the present invention, there is provided a clamp comprising an elongated band having opposite ends and first and second opposite end portions engageable with one another with the first end portion overlapping the second end portion, the first end portion including a plurality of apertures spaced longitudinally from one another, the margins of at least a pair of the apertures on sides thereof toward the end of the first end portion having projections depending from the first end portion and projecting away from the one end, the second end portion including a plurality of hooks spaced from one another and projecting outwardly of the second end portion away from the second end for entering into the apertures and engaging the projections of the first end portion upon the first end portion overlapping the second end portion.

In a further preferred embodiment according to the present invention, there is provided a clamp comprising an elongated band having opposite ends and first and second opposite end portions engageable with one another with the first end portion overlapping the second end portion, one of the first end portion and the second end portion including a plurality of apertures spaced longitudinally from one another, another of the first end portion and the second end portion having projections for entering into the apertures when the first end portion overlaps the second end portion, the band having an outwardly projecting ear between the ends thereof including side wall portions and a bridging band portion extending between the side wall portions, and a pair of lobes projecting generally lengthwise in the direction of the band from each of the opposite side wall portions and in opposite directions away from the bridging band portion forming with the band a purchase on opposite sides of the ear for a crimping tool.

In a still further preferred embodiment according to the present invention, there is provided a clamp comprising an elongated band having opposite ends and first and second opposite end portions engageable with one another with the first end portion overlapping the second end portion, one of the first and second end portions including a plurality of apertures spaced longitudinally from one another, another of the first and second end portions having projections for entering into the apertures upon the first end portion overlapping the second end portion, the second end portion including a protuberance projecting outwardly of the band, the first end portion having a slot for receiving the protuberance and guiding the first and second end portions against relative lateral displacement when the first end portion overlaps the second end portion.

Accordingly, it is a primary object of the present invention to provide a novel and improved hose clamp wherein (i) hooks and projections are provided on underlapping and overlapping end portions, respectively, to provide consistent securement at known diameters of the clamp upon installation and a self-centering action to prevent lateral misalignment; (ii) a protuberance is provided on the end of the underlapping portion to align and provide a self-centering action of the overlapping and underlapping portions to prevent lateral misalignment; and (iii) lobes are provided on the opposite sides of the bridging portion of the ear to define with the parallel side walls of the ear and the band a purchase for a crimping tool to effect final securement of the clamp about the joint.

BRIEF DESCRIPTION OF THE DRAWINGS

FIG. 4 is an elevational view of the clamp band in an elongated flat condition with portions broken out for ease of illustration;

FIG. 5 is an enlarged fragmentary plan view of the band illustrating a pair of the outwardly projecting hooks;

FIG. 5A is a side elevational view of the band portion illustrated in FIG. 5;

FIG. 6 is a view similar to FIG. 5 illustrating the cooperating apparatus and form of the overlapped end portion of the band;

FIG. 6A is a side elevational view of the band portion illustrated in FIG. 6;

FIG. 7 is a fragmentary side elevational view of the protuberance for guiding the overlapped band portions;

FIG. 8 is a enlarged fragmentary side elevational view of an ear with lobes according to the present invention;

BEST MODE FOR CARRYING OUT THE INVENTION

Figure 1:
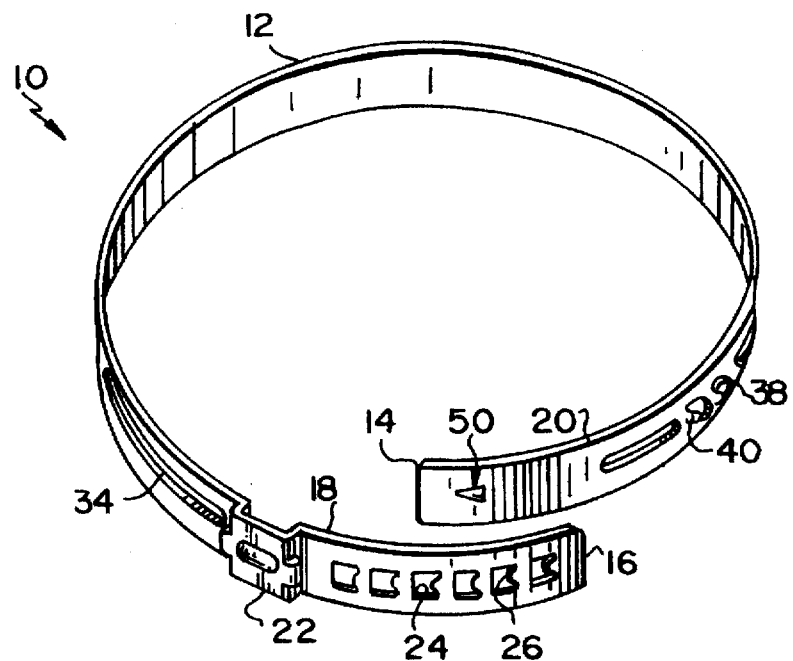
FIG. 1 is a perspective view of a clamp constructed in accordance with the present invention.

Referring now to the drawings, particularly to FIG. 1, there is illustrated a clamp constructed in accordance with the present invention and generally designated 10. Clamp 10 includes a band 12, preferably formed of a metal material, having opposite ends 14 and 16, respectively, as well as a first end portion 18 for overlapping a second end portion 20 of band 12. Band 12 also includes an outwardly projecting ear 22 which can be crimped by a crimping tool (see FIGS. 9 and 10) to firmly secure the band about the joint. It will be appreciated that the band is illustrated in FIG. 1 in its open condition about a joint formed between two parts (not shown), with one part being telescopically received within the other part. For example, a hose may receive a rigid pipe with the band being provided about the exterior of the hose and tightened to secure the hose and pipe to one another. It will be further appreciated that the band can be used to form joints using different types of materials, such as plastics or metal.

From a review of FIGS. 1, 6 and 6A, the first end portion 18 of the band includes a plurality of apertures 24 longitudinally spaced one from the other along the first end portion 18. As illustrated, each aperture is generally rectilinear and has a projection 26 depending from the first band portion 18 which extends generally radially inwardly of the band when clamped about a generally circular part of the joint. The projections 26 extend from a margin of each aperture 24 in a direction away from the band end 16. As best illustrated in FIG. 6 and 6A, each projection 26 has curved side walls 30 terminating in an arcuate tip 28 forming an inwardly directed tapered recess 32 along the outer surface of the projection. The projection 26 extends out of the plane of the band a distance equal to or less than the thickness of the band material to avoid projecting into a part being clamped when the band is finally secured about that part. Projection 26 thus flares or tapers from its opposite sides towards a central longitudinal axis A—A along band 12 and inwardly toward the underlying end portion 20 when band end portion 18 overlaps end portion 20.

On the side of ear 22 remote from the end 16, there is provided in the first end portion 18 an elongated slot 34 extending substantially medially of the width of the band as illustrated and for reasons discussed hereafter. Slot 34 extends longitudinally of the band a distance substantially equal to the longitudinal extent of the apertures 24 along band end portion 18.

Referring now to FIGS. 1, 5 and 5A, the second band end portion 20 includes a plurality of openings 38 spaced one from the other in the longitudinal direction of the band. The openings have generally parallel is sides with an arcuate surface 39 at one end and a hook 40 projecting into the aperture 38 from the opposite end. As illustrated in FIGS. 1 and 5A, each hook 40 projects outwardly of the second end portion 20 and extends from a side of the aperture 38 nearest the second end 14 (FIGS. 1 and 4) in a direction generally away from second end 14. As illustrated in FIG. 5, each hook includes a main body portion 42 projecting outwardly from the band and terminating in a tip portion 44. The body portion 42 is formed to project outwardly about a transversely extending axis B—B at the base of the hook 40 and aperture 38. Hook 40 also includes side wall portions which project laterally from the main body portion 42 and which constitute tapered side walls 46 connecting between the main body and the band. The margins 47 of the hook 40 also taper outwardly toward the opposite sides of the aperture.

Between the end 14 and the hooks 40 of the second end portion 20, there is provided a protuberance 50 which projects outwardly of the band. As best illustrated upon comparison of FIGS. 3 and 7, the protuberance 50 has flared or tapered side wall portions 52 terminating in an apex 53. The protuberance 50 has a width at its base in the band portion 20 corresponding generally to the width of the slot 34 in the first end portion 18. Thus, protuberance 50 may extend into slot 34 with the side wall portions 52 centering the underlying end portion 20 and overlying end portion 18 relative to one another and against lateral displacement.

Figure 3:
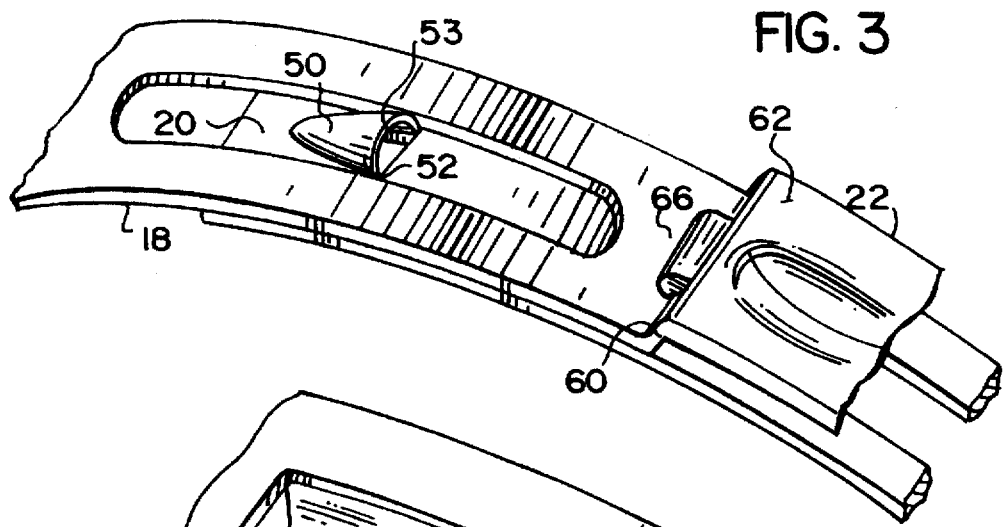
FIG. 3 is an enlarged perspective view illustrating the guide slot in the overlapped end portion and a protuberance in the underlapped portion.
Figure 2:
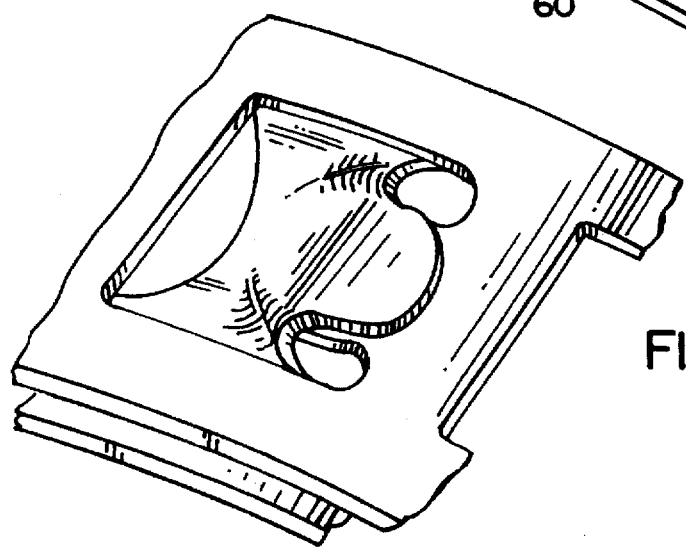
FIG. 2 is an enlarged fragmentary perspective view illustrating an interlocking relation between the hooks of the underlapped portion and the depending projections of the overlapped portion.

Turning now to FIGS. 1, 3 and 8, ear 22 includes side wall portions 60 and a bridging band portion 62 between the side wall portions 60. As best illustrated in FIG. 8, the side wall portions 60 lie generally parallel to one another with the bridging band portion 62 lying at right angles to each of the side wall sections 60. This facilitates the formation of the ear by a forming machine. A rib 64 is provided in the bridging portion 62 to prevent dunce-capping of the ear upon application of the crimping tool to the ear.

Figure 10:
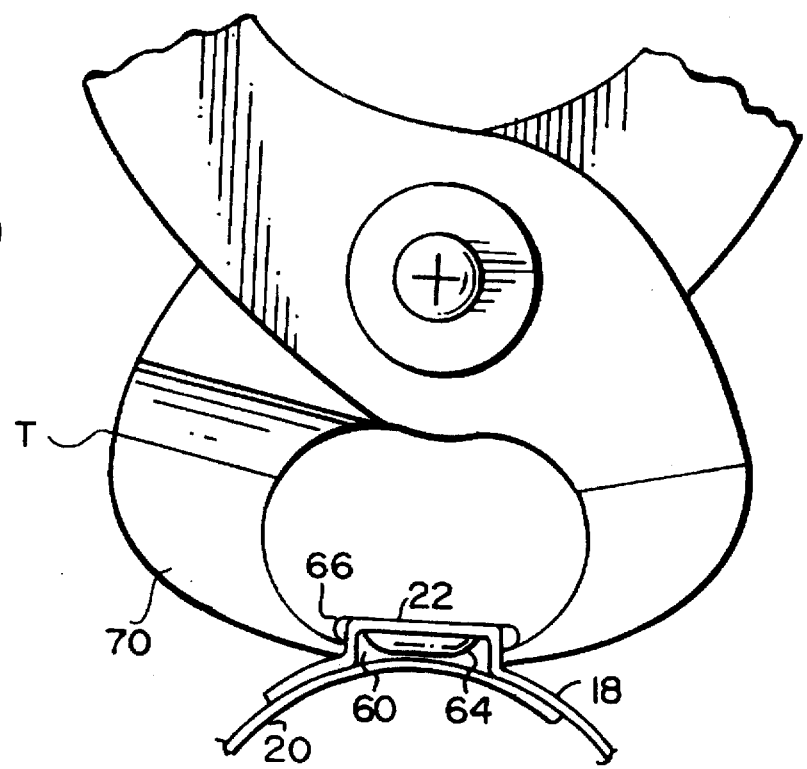
FIG. 10 is a similar view illustrating the clamp of the present invention with the lobes on the ears being secured by the crimping tool.

In accordance with the present invention, the ear includes a pair of lobes 66 which project in opposite directions from the opposite side walls 60 and from the bridging portion 62. The lobes are preferably centrally located of the side walls of the ears and project outwardly to form with the side walls 60 and band 12 a purchase on opposite sides of the ear for a crimping tool, such as illustrated in FIG. 10.

Figure 11:
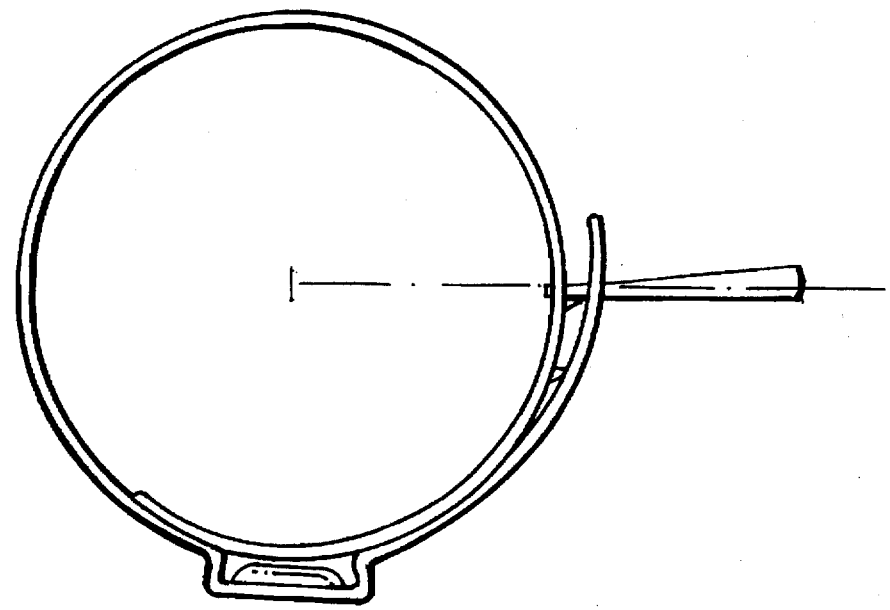
FIG. 11 is a schematic illustration of a clamp of the prior art being leveraged into securement.
Figure 12:
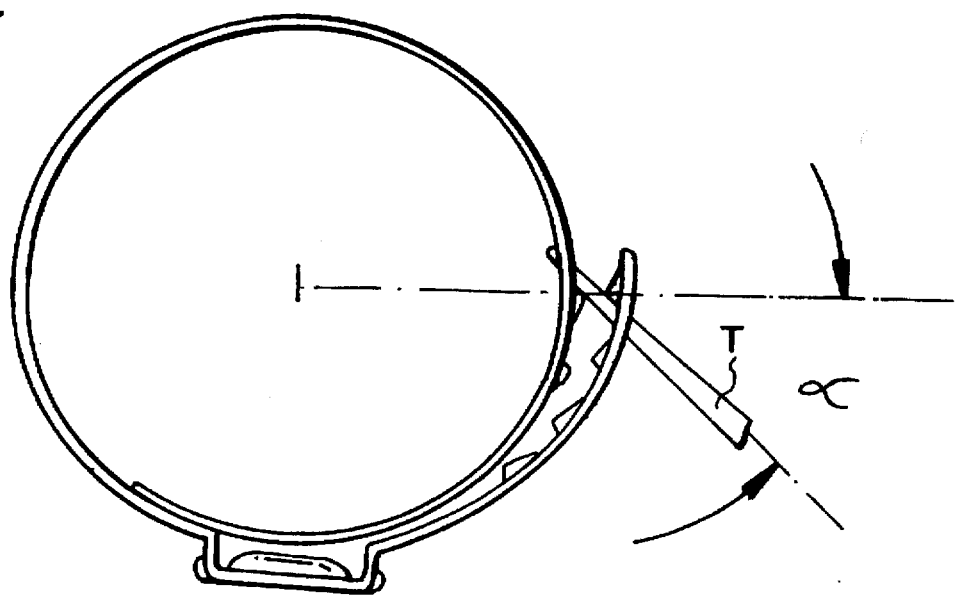
FIG. 12 is a view similar to FIG. 10 illustrating the clamp of the present invention being leveraged into a secured position.

To employ the clamp of the present invention, the clamp, in its open configuration illustrated in FIG. 1, is disposed about the parts to be secured one to the other. With the first end portion 18 overlapping the second end portion 20, a tool T (FIG. 12) may be inserted through an aperture 24 of the first end portion 18 and into an opening 38 of the overlapped second end portion 20. Because of the length of the openings 38 and the initial deformation of the hook 40 into the shape described above, the tool T can be inserted through the aperture 24 and into the opening 38 at an installation angle illustrated in FIG. 12 which affords substantial leverage to tension the band and guide the first end portion 18 onto the second end portion 20. As illustrated in FIG. 12, the tool T forms a substantial angle α, i.e., on the order of 40° to 50° as indicated by the arrows with tool T engaging through both the aperture and opening whereby substantial leverage is obtained by rotating the tool, for example, in the counterclockwise direction illustrated in FIG. 12, to and past the overcenter (radial) position indicated by the dot-dashed lines in FIG. 12. As end portion 18 is guided onto end portion 20, the hooks 40 engage in the apertures 24 and, upon withdrawal of tool T, overlie and engage the recessed portions 32 of the projections 26. In contrast, certain prior art clamps do not provide leverage of this magnitude. For example, in FIG. 11, where small openings are provided in the overlapped band portion and deformable hooks or teeth are provided, the tool inserted into the openings may only be inserted at essentially the overcenter position and consequently leverage to secure the band about the parts is minimal. In contrast to certain prior hose clamps, the geometry of the hooks of the present invention affords sufficient strength to the hooks to avoid their deformation when in contact with the tool T and leverage is applied to the tool. Still further, the tapered margins 47 of the hooks cooperate with the recessed portions 32 of the projections to center the overlapped and underlapped end portions relative to one another and against relative lateral displacement.

With the use of preformed hooks 40 and projections 26, a controlled clamp diameter before tightening of the clamp about the parts is provided. That is, the clamp diameter is precise and capable of being reproduced from clamp to clamp. The hooks and projections engage and interlock with one another when under load to a known resting point, affording an improved locking configuration capable of carrying band installation loads. The hooks and projections cooperate to provide a means to prevent vertical separation of the lapped and lapping band portions when under the loading. Note also that the geometry of the hooks coupled with the geometry of the projections provides for self-alignment or self-centering of the lapping and lapped portions. That is, because the hooks have a tip portion 44 angled to the surface of the band as illustrated in FIG. 5A and also have tapered margins, the engagement of the hooks in the apertures 24 permits shifting of the overlapped and underlapped end portions of the band relative to one another in a direction centering or aligning the bands with one another. Additionally, the depression or recess 32 formed in the projections assists to align the overlapping band portions relative to one another and prevent lateral misalignment.

Figure 9:
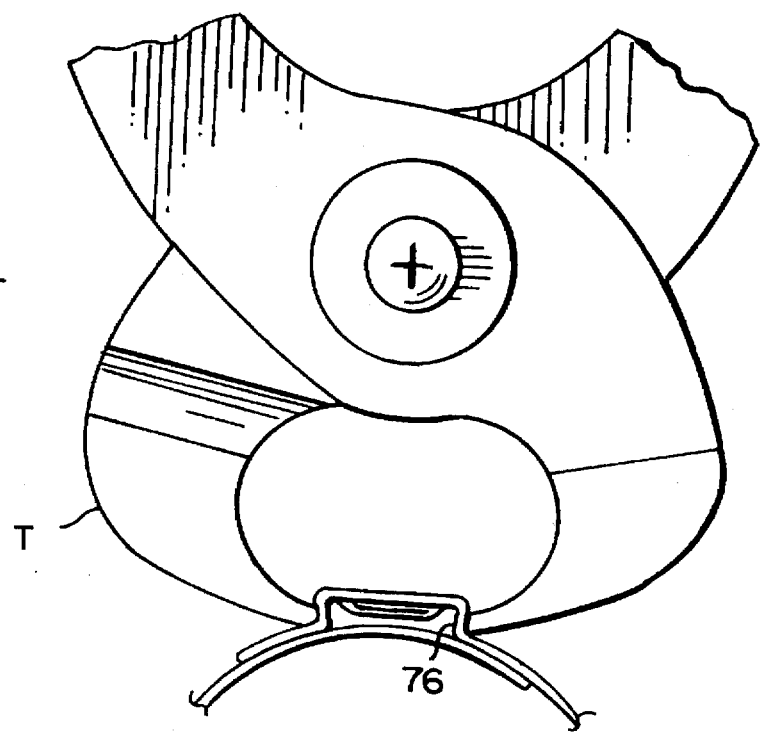
FIG. 9 is a fragmentary schematic illustration of the prior art illustrating a Keystone clamp being tightened by a crimping tool.

It will be appreciated that the number of apertures and projections 24 and 26, respectively, in the first end portion 18 is in excess of the number of hooks 40 in the second band end portion 20. This enables the clamp to be used for various diameters within a predetermined range of diameters with the hooks engaging in selected ones of the apertures 24 depending upon the diameter of the pads to be secured. Once the overlapped and underlapped portions of the clamp have been engaged and the locking configuration of the hook and projections carries the band installation loads, the clamp may be crimped into its secured position. Referring now to FIG. 10, a clamping tool is inserted between the lobes 66 and the outer band end portions with the tool edges engaging the side walls 60 of ear 22 as illustrated in FIG. 9. The clamping tool has clamping jaws 70 which have a lateral extent equal to or exceeding the lateral width of the band. By forming lobes 66 on the ear 22 and providing sides which are generally parallel to one another, the clamping jaws of the crimping tool are prevented from slipping off the ear during tightening or crimping. Because the ear 22 has substantially straight parallel sides, there is a tendency of the tightening tool to slip off the ear. However, the lobes 66 act as a tool stop near the top of the ear to prevent the tool from slipping off the ear and define with the band and side walls a purchase for the tool on opposite sides of the ear. It will be appreciated that, in the prior art ears (see FIG. 9), the side walls 76 were tapered inwardly relative to one another to enable the crimping tool to engage the side walls without slipping from the ear. However, those tapered side walls are difficult to manufacture. In the present invention, the generally parallel side walls 60 can be stamped and formed in a progressive manner facilitating manufacturing, while the lobes 66 prevent the crimping tool T from slipping off the ear similarly as the tapered side walls served that function in the prior art.

It will also be appreciated that during the band installation, the protuberance 50 engages in the slot 34. Note that, during installation and final securement, the second band end portion 20 extends below or underlies the first band end portion 18, as well as the ear 22, the latter precluding any pinching of the parts being secured and serving as a liner or a bridge across the open bottom portion of the ear. The protuberance 50 extends within the slot 34 and which slot enables longitudinal movement of the band end portion 20 relative to band end portion 18 during tightening. The protuberance 50 thus guides the lapped portion and the underlapped portion for movement relative to one another without lateral shifting, thereby providing consistent tracking between the lapping portion and lapped portion. Note that because the base dimension of the protuberance is substantially the width of the slot and the protuberance is tapered outwardly, the engagement of the protuberance in the slot affords a self-centering action between the lapping portion and the lapped portion. Thus, side-by-side alignment of the lapping and lapped portions of the band is achieved, while allowing for continued movement of the lapped portion relative to the lapping portion while tightening.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A clamp comprising:
   an elongated band having opposite ends and first and second opposite end portions engageable with one another with said first end portion overlapping said second end portion, said first end portion including a plurality of apertures spaced longitudinally from one another, the margins of at least a pair of said apertures on sides thereof toward said end of said first end portion having projections preformed to project from said first end portion out of said band toward said second end portion and projecting away from said one end;
   said second end portion including a plurality of hooks spaced from one another and preformed to project outwardly of said second end portion out of said band toward said first end portion and away from said second end for entering into said apertures, said hooks engaging said projections of said first end portion upon said first end portion overlapping and engaging said second end portion whereby said hooks and said projections prevent separation of said end portions from one another.

2. A clamp according to claim 1 wherein said hooks said projections are preformed to preclude deformation under loading.

3. A clamp according to claim 1 wherein each said hook includes a main body portion projecting from said band terminating in a tip portion extending from said main body portion, said main body portion being formed from said band about an axis transverse to the length of said band and having side wall portions extending and forming a structured connection between said main body portion and said band at locations between said axis and said tip.

4. A clamp according to claim 3 wherein said second end portion includes a plurality of openings spaced therealong with said hooks located at the margins of said openings nearest said second end and projecting in a direction generally away from said second end.

5. A clamp according to claim 1 wherein said hooks have tapered sides projecting out of the band and receivable within the apertures of said first end portion for centering and preventing lateral misalignment of said first and second end portions relative to one anther when said first end portion overlaps said second end portion.

6. A clamp according to claim 1 wherein the number of said apertures in said first end portion exceeds the number of hooks in said second end portion, said hooks being disposed in selected apertures upon said first end portion overlapping said second end portion whereby the diameter of the clamp is adjustable.

7. A clamp according to claim 1 wherein said second end portion includes a protuberance projecting outwardly of said band at a location between said second end and said hooks, said first end portion having a slot on a side of said projections remote from said first end for receiving said protuberance and guiding the first and second end portions against relative lateral displacement upon said first end portion overlapping said second end portion.

8. A clamp according to claim 7 wherein said protuberance has tapered side walls for guiding the protuberance into said slot, said protuberance having a width at a base portion thereof substantially corresponding to the width of said slot.

9. A clamp according to claim 7 wherein said band has an outwardly projecting ear between said ends thereof including side wall portions and a bridging band portion extending between said side wall portions, said ear being located along said first end portion between said apertures and said slot with said second end portion spanning across said ear when said first end portion overlaps said second end portion.

10. A clamp comprising:
    an elongated band having opposite ends and first and second opposite end portions engageable with one another with said first end portion overlapping said second end portion, one of said first end portion and said second end portion including a plurality of apertures spaced longitudinally from one another, another of said first end portion and said second end portion having projections for entering into said apertures when said first end portion overlaps said second end portion;
    said band having an outwardly projecting ear between said ends thereof including side wall portions and a bridging band portion extending between said side wall portions, and a pair of lobes projecting generally lengthwise in the direction of said band from each of the opposite side wall portions and in opposite directions away from said bridging band portion forming with said band a purchase on opposite sides of said ear for a crimping tool.

11. A clamp according to claim 1 wherein said side wall portions lie generally parallel to one another.

12. A clamp comprising:

an elongated band having opposite ends and first and second end portions engageable with one another, said first end portion overlapping said second end portion, elements on said first end portion and said second end portion interacting one with the other to secure the first and second end portions one to the other;

said band having an outwardly projecting ear between said ends thereof including side wall portions and a bridging band portion extending between said side wall portions, and a pair of lobes projecting generally lengthwise in the direction of said band from each of the opposite side wall portions and in opposite directions away from said bridging band portion forming with said band a purchase on opposite sides of said ear for a crimping tool.

13. A clamp comprising:

an elongated band having opposite ends and first and second opposite end portions engageable with one another with said first end portion overlapping said second end portion, said first end portion including a plurality of apertures spaced longitudinally from one another, the margins of at least a pair of said apertures on sides thereof toward said end of said first end portion having projections depending from said first end portion and projecting away from said one end; and said second end portion including a plurality of hooks spaced from one another and projecting outwardly of said second end portion away from said second end for entering into said apertures and engaging said projections of said first end portion upon said first end portion overlapping said second end portion;

said band having an outwardly projecting ear between said ends thereof including side wall portions and a bridging band portion extending between said side wall portions, and a pair of lobes projecting generally lengthwise in the direction of said band from each of the opposite side wall portions and in opposite directions away from said bridging band portion.

14. A clamp according to claim 13 wherein said side wall portions lie generally parallel to one another and said lobes and said band define a purchase for a crimping tool along said side walls.

15. A clamp comprising:

an elongated band having opposite ends and first and second opposite end portions engageable with one another with said first end portion overlapping said second end portion, said first end portion including a plurality of apertures spaced longitudinally from one another, the margins of at least a pair of said apertures on sides thereof toward said end of said first end portion having projections depending from said first end portion and projecting away from said one end;

said second end portion including a plurality of hooks spaced from one another and projecting outwardly of said second end portion away from said second end for entering into said apertures and engaging said projections of said first end portion upon said first end portion overlapping said second end portion;

said second end portion including a protuberance projecting outwardly of said band at a location between said second end and said hooks, said first end portion having a slot on a side of said projections remote from said first end for receiving said protuberance and guiding the first and second end portions against relative lateral displacement upon said first end portion overlapping said second end portion;

said band having an outwardly projecting ear between said ends thereof including side wall portions and a bridging band portion extending between said side wall portions, said ear being located along said first end portion between said apertures and said slot with said second end portion spanning across said ear when said first end portion over laps said second end portion;

and a pair of lobes projecting generally lengthwise in the direction of said band from each of the opposite side wall portions and in opposite directions away from said bridging band portion.

16. A clamp comprising:

an elongated band having opposite ends and first and second opposite end portions engageable with one another with said first end portion overlapping said second end portion, one of said first and second end portions including a plurality of apertures spaced longitudinally from one another, another of said first and second end portions having projections for entering into said apertures upon said first end portion overlapping said second end portion;

said second end portion including a protuberance projecting outwardly of said band, said first end portion having a slot for receiving said protuberance and guiding the first and second end portions against relative lateral displacement when said first end portion overlaps said second end portion;

said band having an outwardly projecting ear between said ends thereof including side wall portions and a bridging band portion extending between said side wall portions, said ear being located along said first end portion between said first end and said slot with said second end portion spanning across said ear when said first end portion overlaps said second end portion; and a pair of lobes projecting generally lengthwise in the direction of said band from each of the opposite side wall portions and in opposite directions away from said bridging band portion.

* * * * *